(12) United States Patent  
Barrieau

(10) Patent No.: US 7,459,881 B2  
(45) Date of Patent: Dec. 2, 2008

(54) METHOD AND APPARATUS FOR MONITORING BATTERY BACK-UP POWER IN AN ALARM SYSTEM

(75) Inventor: Mark P. Barrieau, Baldwinville, MA (US)

(73) Assignee: SimplexGrinnell LP, Westminster, MA (US)

( * ) Notice: Subject to any disclaimer, the term of this patent is extended or adjusted under 35 U.S.C. 154(b) by 60 days.

(21) Appl. No.: 11/521,877

(22) Filed: Sep. 15, 2006

(65) Prior Publication Data

US 2008/0079387 A1   Apr. 3, 2008

(51) Int. Cl.
*H01M 10/46* (2006.01)
(52) U.S. Cl. ...................................... 320/103
(58) Field of Classification Search ................. 320/103, 320/107, 112, 114, 115
See application file for complete search history.

(56) References Cited

U.S. PATENT DOCUMENTS 5,896,022 A * 4/1999 Jacobs, Sr. .................. 320/103

* cited by examiner

*Primary Examiner*—Edward Tso
(74) *Attorney, Agent, or Firm*—The Small Patent Law Group, LLP

(57) ABSTRACT

An alarm system with improved power is provided. The improved power comprises at least two batteries. Each battery has the capacity to individually back up the alarm system for a standby period. The alarm system selects either battery and operates from that battery. A switching network is coupled to a power source and to the batteries. The switching network is capable of transferring one battery to charge and the other battery to discharge, with the discharge battery providing power to the alarm system. A battery charger circuit is powered from a power source. The battery charger circuit is used to charge the battery that is not powering the alarm system. Circuitry and software can be provided to monitor the health of the batteries.

26 Claims, 2 Drawing Sheets

METHOD AND APPARATUS FOR MONITORING BATTERY BACK-UP POWER IN AN ALARM SYSTEM

BACKGROUND OF THE INVENTION

Embodiments of the present invention generally relate to methods and systems for providing alarm systems. Typical building fire alarm systems include a number of fire detectors positioned throughout a building. Signals from those detectors are monitored by a system controller, which, upon sensing an alarm condition, sounds audible alarms throughout the building. Flashing light strobes may also be positioned throughout the building to provide a visual alarm indication. The audible alarms and strobes are typically connected across common power lines on a notification circuit.

In a typical alarm system within a building, such as a fire or burglar alarm system, many types of sensors, detectors, lights, strobes, sounders and other associated devices may be located throughout the building as part of the alarm system. Groups of these devices are often wired together along one or more pairs of electrical lines used to supply power and communications to the devices. A group of such devices wired on a commonly shared pair of lines is often referred to as a line of devices. Many separate lines of devices typically connect back to a control panel that controls the overall operation of the alarm system. A line of devices is usually associated with a certain zone of the building and/or a certain type of device. For example, one floor of a multi-story building may have all of its smoke detectors wired together on a line that connects back to the control panel.

The current practice is to power fire alarm systems from the AC line (primary power) and to have batteries as the secondary power source in the event of AC failure. This method has several disadvantages. First, the standby batteries require periodic testing. The National Fire Protection Association (NFPA), 1 Batterymarch Park, Quincy, Mass. 02169-7471 requires that batteries be tested twice per year. The preferred method is to fully discharge the batteries. This requires that a service technician be on site to conduct the battery test. This is expensive, since it involves labor costs.

Various other methods for testing batteries under load are in common use; however, these methods are deficient in that they do not fully test the battery. These methods do not fully discharge the batteries, but rather discharge the battery slightly. For example, a common method includes switching a load across the batteries. In one example, the load switched is 10 amperes with a 25 Ah battery being used. The test is run periodically—say every 30 minutes—for 10 seconds. This is because more severe discharge rates would jeopardize recharging the battery quickly enough to meet NFPA requirements. A discharge of 10 amperes for 10 seconds represents 0.1522% of the total capacity of a 25 Ah battery. Discharging 0.1522% of battery capacity is not adequate to accurately measure the battery state. Discharging such a small fraction of battery capacity provides little information regarding the condition of a battery. So, this type of battery test is ineffective. Worse, this type of test can build a false sense of security that the alarm system is capable of monitoring battery capacity.

What would therefore be beneficial would be to provide improved power for an alarm system. What would also be beneficial would be to better monitor the capacity of batteries in an alarm system.

SUMMARY OF THE INVENTION

An alarm system in accordance with the embodiments of the present invention provides improved power for an alarm system. An alarm system in accordance with the embodiments of the present invention better monitors the capacity of batteries in an alarm system. In accordance with the embodiments of the present invention, at least two batteries are provided. Each battery has the capacity to individually back up the alarm system for a standby period. The alarm system selects either battery and operates from that battery. A switching network is coupled to a power source and to the batteries. The switching network is capable of transferring one battery to charge and the other battery to discharge, with the discharge battery providing power to the alarm system. A battery charger circuit is powered from a power source. The battery charger circuit is used to charge the battery that is not powering the alarm system. In one embodiment, circuitry and software can be provided to monitor the health of the batteries.

BRIEF DESCRIPTION OF THE DRAWINGS

The foregoing and other objects, features, and advantages of the invention will be apparent from the following more particular description of preferred embodiments of the invention, as illustrated in the accompanying drawings. The drawings are not necessarily to scale, emphasis instead being placed upon illustrating the embodiments of the invention.

DETAILED DESCRIPTION OF THE PREFERRED EMBODIMENTS

In accordance with the embodiments of the present invention, an alarm system provides improved power for an alarm system. An alarm system in accordance with the embodiments of the present invention better monitors the capacity of batteries in an alarm system.

Figure 1:
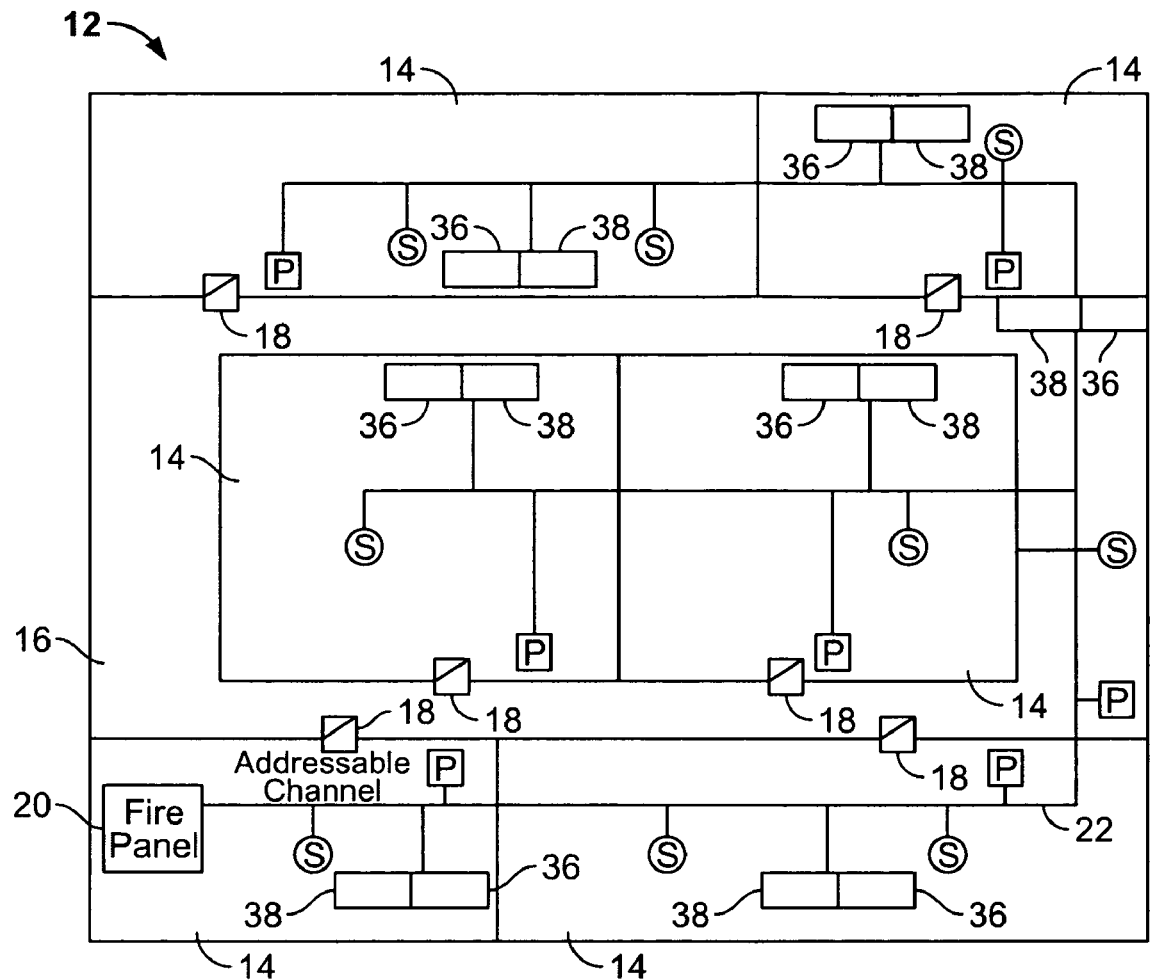
FIG. 1 is a schematic of an example alarm system.

Referring to FIG. 1, a schematic of an alarm system in accordance with the embodiments of the present invention is seen. The alarm system is displayed as on a floor 12 of a single or a multi-story building. The floor 12 includes a plurality of rooms 14. A hallway 16 allows ingress and egress to and from the rooms 14. Each room 14 is accessible from the hallway 16 by a door 18.

Figure 2:
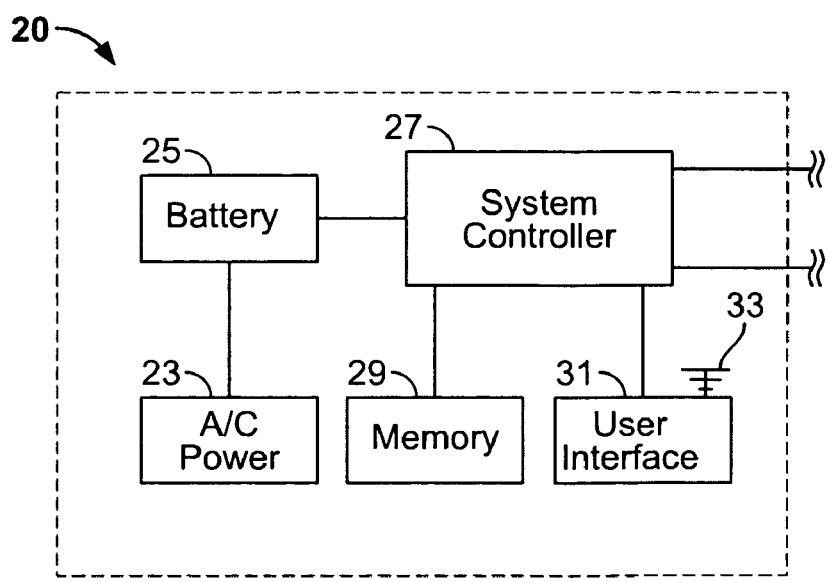
FIG. 2 is a block diagram of the fire panel of the alarm system of FIG. 1.

The alarm system includes a fire panel 20 coupled to a detector network 22. Referring to FIG. 2, a block diagram of the fire panel 20 is seen. The fire panel 20 provides alarm system power such as a power source 23 and battery back-up 25, described in detail below. A system controller 27 provides alarm system control and supervision. Other standard elements such as memory 29, a user interface 31, and a wireless or wired communications interface 33 can be further provided.

Referring back to FIG. 1, the detector network 22 can include an addressable channel that connects to a plurality of initiation devices such as smoke detectors (S) and pull stations (P). Preferably in fire detection practice, each room 14 and the hallway 16 should include at least one such initiation device. Notification devices such as audible alarms 36 and light strobe alarms 38 can be provided connected in the detector network 22. When an alarm condition is sensed, the system controller 27 of the fire panel 20 signals an alarm to the appropriate device 36, 38 through the detector network 22.

In accordance with the embodiments of the present invention, battery capacity can be accurately measured as part of normal alarm system operation. Alarm systems in the prior art typically use two batteries of for example 12V in series to provide backup power to a fire panel 20 of for example 24V; thus, alarm systems are typically 24V because they operate on two 12V batteries in series.

In accordance with the embodiments of the present invention, at least two batteries are provided, each with the capacity to individually back up the alarm system for a standby period. Under normal conditions, the alarm system selects either battery, and operates from that battery. The alarm system employs a battery charger circuit powered from an AC supply. The battery charger circuit is used to charge the battery that is not powering the alarm system.

Circuitry and software can be provided to monitor the discharge rate of the discharging battery. While the battery is discharged, the alarm system monitors the battery voltage and current over time to determine the battery capacity in ampere-hours. The battery capacity is logged. When the battery under discharge reaches full discharge, or some other chosen discharge level, a switching network switches the batteries in the circuit so that the previously discharging battery is now being recharged via the battery charger circuit powered from the AC line and the previous charged battery is now being discharged. This cycle can be repeated on a schedule permitted by the characteristics of the battery. When not running on battery power, the alarm system can be operated from the AC line. Once again, when the discharge level of the battery now under discharge reaches some chosen discharge level, the switching network switches the batteries in the circuit so that the previously discharging battery is recharged and previous charged battery is discharging.

In an additional embodiment, circuitry and software can be provided to monitor the state of the batteries from data gathered by recharging and discharging. An unhealthy battery can be identified, and a fault condition can be logged to notify service personnel that the battery is defective. For example, if a battery is found to have insufficient capacity, an alert can be sent.

In one embodiment of the present invention, at least two 12V batteries can be provided, each with the capacity to individually back up the alarm system for the standby period. Under normal conditions, the alarm system selects either battery and operates from that battery. The AC power is used via the battery charger circuit to charge the battery not powering the alarm system. Alarm system power is still 24V, but is derived from the 12V battery via a voltage converter. The alarm system also provides regulated 24V output under all conditions, including operation from low battery. This is a benefit because most alarm devices and appliances in use today are constant-power devices. This means that most alarm devices and appliances in use today draw more current with decreasing battery voltage, thus increasing losses on wiring.

Figure 3:
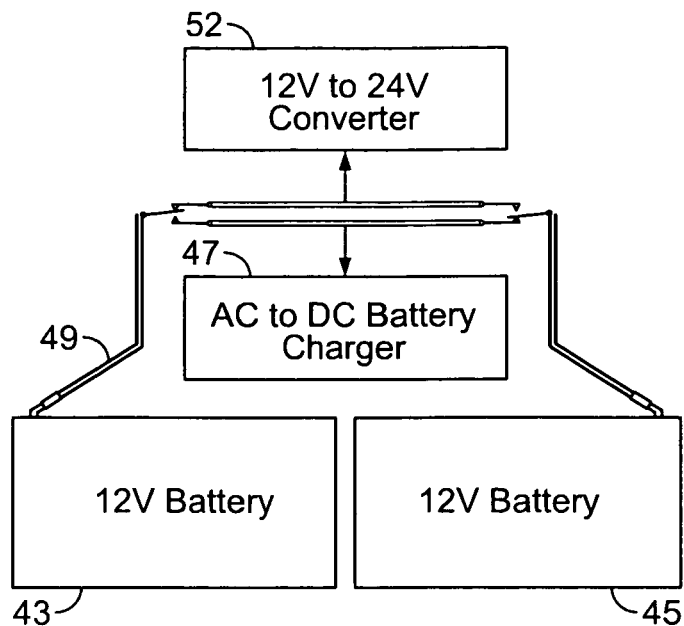
FIG. 3 is a schematic diagram of an example of an improved power supply in accordance with the embodiments of the present invention.

Referring to FIG. 3, a schematic diagram of an example of an improved power supply in accordance with the embodiments of the present invention is seen. At least two 12V batteries 43, 45 are provided. An AC to DC battery charger 47 and a DC-DC boost type converter 52 are provided. A switching network 49 transfers one battery, say battery 45 to charge and the other battery, say battery 43 to discharge. While under discharge, battery 43 is providing power to the alarm system through the DC-DC converter 52. The DC-DC converter 52 converts 12V to 24V. This provides a regulated output voltage, even under low-battery condition such as those tested under UL864 promulgated by Underwriters Laboratories Inc., 333 Pfingsten Road, Northbrook, Ill. 60062-2096. When the discharge level of the battery 43 now under discharge reaches some chosen discharge level, the switching network 49 switches the batteries 43, 45 so that the previously discharging battery 43 is recharged and previous charged battery 45 powers the alarm system through the DC-DC converter 52.

Figure 4:
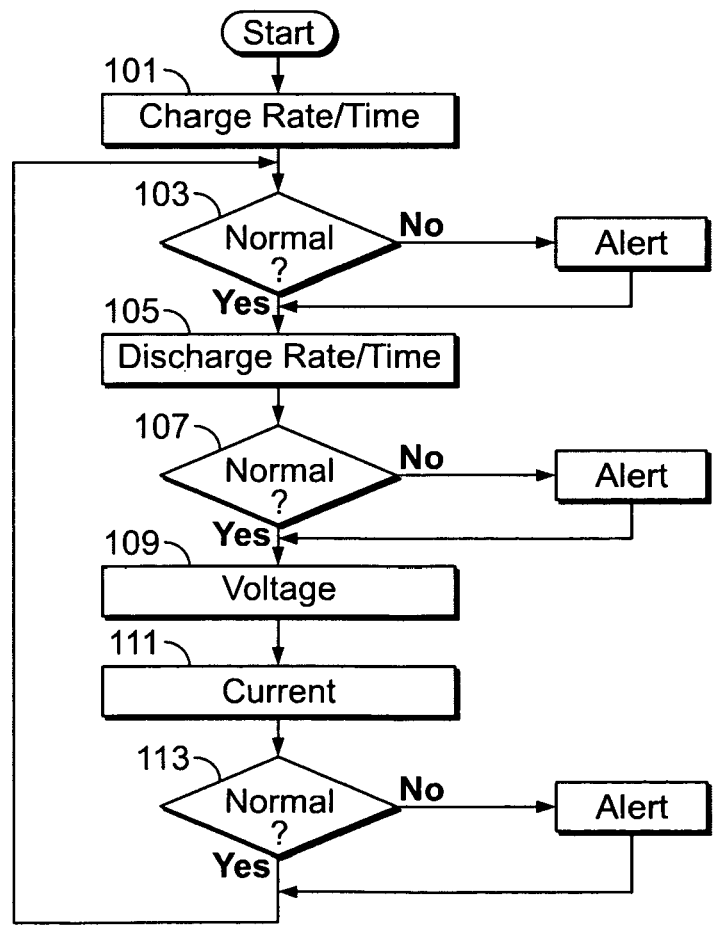
FIG. 4 is a process flow diagram of the alarm system of FIG. 3.

As previously referenced, in one embodiment circuitry and software can be provided to monitor the state of the batteries from data gathered by recharging and discharging. Referring to FIG. 4, a process flow diagram of software to monitor the batteries of the alarm system of FIG. 3 is seen. The charge rate and charge time of a recharging battery 43, 45 is measured (101). The efficiency of the battery in converting electrical energy to stored energy for example can be measured as a measure of battery health. If the charge rate of the recharging battery 43, 45 is not normal (103), then an alert is sounded.

The discharge rate and duration of a discharging battery is measured (105). The discharging of the battery for example can be measured to determine if the battery has sufficient capacity to power the alarm system when required. If the discharge rate of the discharging battery 43, 45 is not normal (107), then an alert is sounded.

The battery voltage is measured over time (109), and the battery current is measured over time (111). The battery current and voltage can be used to determine the battery capacity. If the battery capacity is not normal (113), then an alert is sounded.

The present invention thus ensures that the alarm system will have sufficient battery capacity. The battery can be fully discharged because there is a second battery in reserve. Should the primary power fail at any point in the cycle, there will be sufficient battery capacity to power the alarm system for the required standby time.

By automating an alarm system code-driven test in accordance with the embodiments of the present invention, accuracy is improved and labor costs saved. Another advantage of the present invention is that the alarm system operating voltage is regulated, even under low battery conditions. UL864 states that battery voltage be reduced to 85% of nominal. On a 24V alarm system, this is 20.4V. Because the alarm systems generally do not condition the battery output, this "low battery" state determines wiring distances to notification appliances. Yet another advantage is that the present invention can monitor the state of the batteries from data gathered by recharging and discharging While this invention has been particularly shown and described with references to preferred embodiments thereof, it will be understood by those skilled in the art that various changes in form and details may be made therein without departing from the scope of the invention encompassed by the appended claims.

What is claimed is:

1. An alarm system comprising:
   a system controller;
   at least one of an alarm and a detector interconnected with the system controller;
   at least two batteries interconnected with the system controller, the alarm system selecting a battery from the at least two batteries and operating from the selected battery, each of the at least two batteries having a capacity to individually back up the alarm system for a standby period;

a battery charger powered from a power source and interconnected with the system controller; and a switching network coupled to the battery charger and to the at least two batteries, the switching network being capable of transferring one battery to charge and the other battery to discharge, the battery being discharged providing power to the alarm system, and the battery charger used to charge the battery that is not providing power to the alarm system.

2. The alarm system of claim 1 further including a voltage converter connected to the at least two batteries, with the at least two batteries comprising 12V batteries, the voltage converter being configured to derive 24V from one of the 12V batteries to power the alarm system.

3. The alarm system of claim 1 further wherein the alarm system monitors the at least two batteries.

4. The alarm system of claim 3 further wherein the alarm system monitors recharging of the battery being recharged.

5. The alarm system of claim 4 further wherein the alarm system monitors efficiency of the battery being recharged in converting electrical energy to stored energy as a measure of battery health.

6. The alarm system of claim 3 further wherein the alarm system monitors discharging of the battery providing power to the alarm system.

7. The alarm system of claim 6 further wherein the alarm system monitors the discharging of the battery providing power to the alarm system to determine if the battery being discharged has sufficient capacity to power the alarm system.

8. The alarm system of claim 3 further wherein the alarm system monitors battery voltage and current over time to determine battery capacity.

9. The alarm system of claim 3 further wherein a signal is provided when one of the at least two batteries is unhealthy.

10. A method of providing power to an alarm system comprising:

providing at least two batteries that are interconnected with a system controller within the alarm system;

selecting a battery from the at least two batteries and operating the alarm system from the selected battery;

when the battery operating the alarm system reaches a discharge level, switching the batteries so that a previously charged battery from the at least two batteries is now operating the alarm system; and recharging the previous battery operating the alarm system.

11. The method of providing power to an alarm system of claim 10 wherein the at least two batteries include a first 12V battery and a second 12V battery.

12. The method of providing power to an alarm system of claim 10 further including monitoring the at least two batteries.

13. The method of providing power to an alarm system of claim 12 further including monitoring recharging of the battery being recharged.

14. The method of providing power to an alarm system of claim 13 further including monitoring efficiency of the battery being recharged in converting electrical energy to stored energy as a measure of battery health.

15. The method of providing power to an alarm system of claim 10 further including monitoring a discharging rate of the battery operating the alarm system.

16. The method of providing power to an alarm system of claim 10 further including monitoring -discharging of the battery operating the alarm system to determine if the battery operating the alarm system has sufficient capacity to power the alarm system.

17. The method of providing power to an alarm system of claim 12 further including monitoring battery voltage and current over time to determine battery capacity.

18. The method of providing power to an alarm system of claim 12 further including signaling when one of the at least two batteries is unhealthy.

19. A method of monitoring power in an alarm system comprising:

providing a battery to operate the alarm system, the alarm system comprising at least a system controller and at least one of an alarm and a detector, the battery and the at least one of an alarm and a detector interconnected with the system controller;

alternatively charging and discharging the battery, the discharge of the battery being used to power the alarm system; and monitoring the charging and discharging of the battery.

20. The method of monitoring power in an alarm system of claim 19 further including providing a first battery and a second battery and switching between the first and second batteries such that, when the first battery is discharging and powering the alarm system, the second battery is charging and vice versa.

21. The method of monitoring power in an alarm system of claim 19 further including monitoring charging of the battery being recharged.

22. The method of monitoring power in an alarm system of claim 21 further including monitoring an efficiency of the battery in converting electrical energy to stored energy as a measure of battery health.

23. The method of monitoring power in an alarm system of claim 19 further including monitoring discharging of the battery providing power to the alarm system.

24. The method of monitoring power in an alarm system of claim 23 further including monitoring the discharging of the battery providing power to the alarm system to determine if the battery has sufficient capacity to power the alarm system.

25. The method of monitoring power in an alarm system of claim 19 further including monitoring battery voltage and current over time to determine battery capacity.

26. The method of monitoring power in an alarm system of claim 19 further including signaling when the battery is unhealthy.

* * * * *